(12) United States Patent
Cox, III

(10) Patent No.: US 9,319,087 B1
(45) Date of Patent: Apr. 19, 2016

(54) PROTECTIVE CASE FOR COUPLING COMMUNICATION DEVICES TO A MOBILE DEVICE

(71) Applicant: James L. Cox, III, Dallas, TX (US)

(72) Inventor: James L. Cox, III, Dallas, TX (US)

( * ) Notice: Subject to any disclaimer, the term of this patent is extended or adjusted under 35 U.S.C. 154(b) by 0 days.

(21) Appl. No.: 14/745,252

(22) Filed: Jun. 19, 2015

Related U.S. Application Data

(63) Continuation of application No. 13/890,084, filed on May 8, 2013, now abandoned.

(60) Provisional application No. 61/713,155, filed on Oct. 12, 2012.

(51) Int. Cl.
| | | |
|---|---|---|
| H04B 1/38 | (2015.01) | |
| H04W 88/02 | (2009.01) | |
| H04B 1/3888 | (2015.01) | |
| H04B 1/3827 | (2015.01) | |
| H04B 1/3883 | (2015.01) | |
| H04W 88/06 | (2009.01) | |

(52) U.S. Cl.
CPC ............ *H04B 1/3888* (2013.01); *H04B 1/3833* (2013.01); *H04B 1/3883* (2013.01); *H04W 88/06* (2013.01)

(58) Field of Classification Search
None
See application file for complete search history.

(56) References Cited

U.S. PATENT DOCUMENTS

| 6,061,579 | A | * | 5/2000 | Arai | ........................ | H01Q 1/084 |
|---|---|---|---|---|---|---|
| | | | | | | 455/347 |
| 2003/0171097 | A1 | * | 9/2003 | Soejima | ............. | H04B 7/18517 |
| | | | | | | 455/12.1 |
| 2005/0048934 | A1 | * | 3/2005 | Rawnick | .............. | H01Q 9/0457 |
| | | | | | | 455/107 |
| 2011/0136428 | A1 | * | 6/2011 | Ritter | ................. | H04B 7/18517 |
| | | | | | | 455/13.4 |

* cited by examiner

*Primary Examiner* — Philip Sobutka
(74) *Attorney, Agent, or Firm* — Morgan, Lewis & Bockius LLP

(57) ABSTRACT

A protective case sized and shaped to integrate a smartphone with a satellite communications device in a handheld form to conveniently allow communication both via the smartphone and the satellite communications device, with both devices arranged in the case so as to not detune the communications device is disclosed.

13 Claims, 1 Drawing Sheet

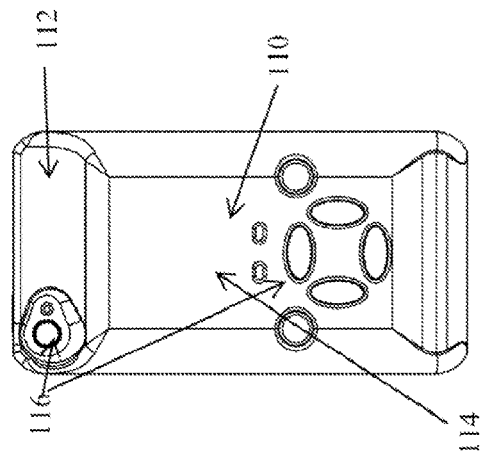
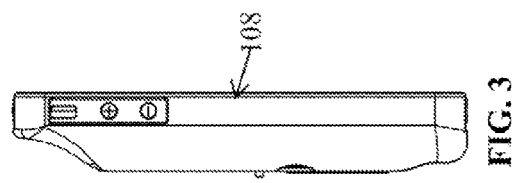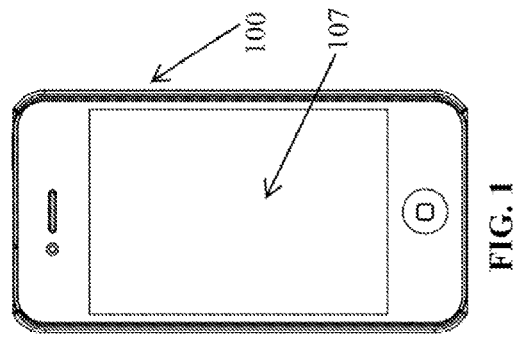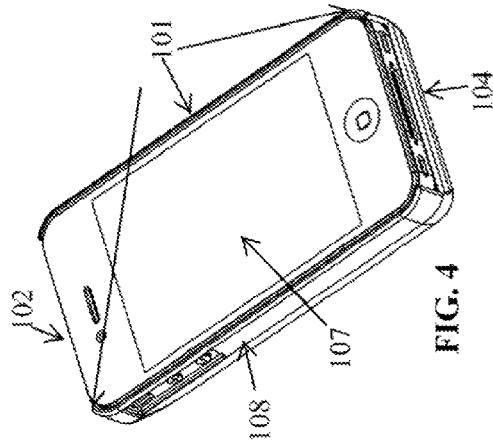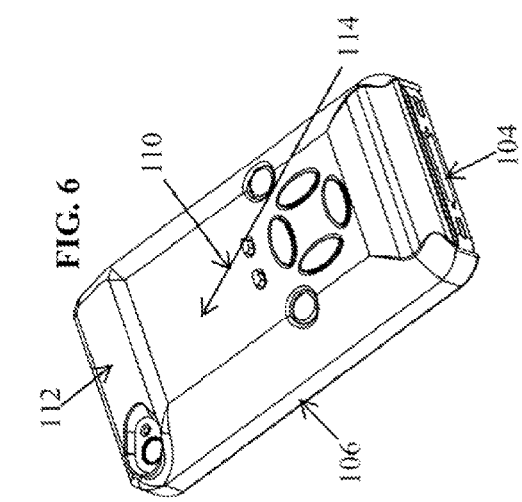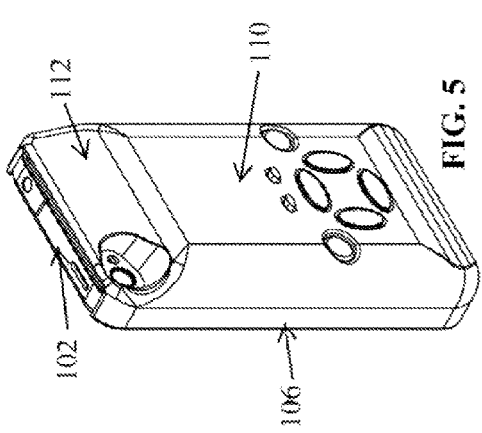

PROTECTIVE CASE FOR COUPLING COMMUNICATION DEVICES TO A MOBILE DEVICE

I. CROSS-REFERENCE TO RELATED APPLICATIONS

This application is a continuation of U.S. patent application Ser. No. 13/890,084 filed on May 8, 2013, now abandoned, which is hereby incorporated by reference. This application also claims the benefit of provisional Patent Application No. 61/713,155 filed on Oct. 12, 2012.

II. FIELD OF THE TECHNOLOGY

The present disclosure relates to smartphone protective cases that allow bundling of multiple communication devices in a handheld form that can operate without detuning or degradation of signal.

III. SUMMARY

One object of this disclosure is to create a case that allows for porting two or more communication devices in the same small unit for increased convenience while securing the communication devices in such a manner that the presence of one communication device does not detune any other. In that manner, the present protective case is typically made of durable hard material that can be secured by a lip or other means around a smartphone to house a satellite communication device or other communication device such that the devices are substantially immobile relative to one other and physically separates the housing of the smartphone from the satellite or other communication device. The satellite communication device, for example, is thereby placed at a location where the signal will not be blocked by normal usage. This application incorporates by reference as if fully disclosed herein Provisional Patent Application No. 61/713,155.

IV. BRIEF DESCRIPTION OF THE DRAWINGS

FIG. 1 is an orthogonal view of an embodiment of the protective case in its environment showing through the front face an exemplary cell phone (smartphone).

FIG. 2 is a back view of an embodiment of the protective case.

FIG. 3 is one side view of an embodiment of the protective case.

FIG. 4 is an orthogonal front view of an embodiment of the protective case in its environment show through front face an exemplary smartphone.

FIG. 5 is an orthogonal view of the back and side of an embodiment of the protective case.

FIG. 6 is orthogonal view of the back of an embodiment of the protective case to highlight the formation of apertures by the case materials.

V. BACKGROUND

Smartphones and satellite communication devices exist, but no product integrates two or more devices into a convenient case that ensures all devices work properly without any communication device having reduced communication ability while giving the user the cost-saving benefit of integrating an already-owned smartphone into a single case capable of communicating over multiple paths for example cellular and satellite paths.

One example is shown in the application Ser. No. 12/957,767 to Ritter. There, an SMS satellite is shown attached device to the back of an iPhone. Ritter does not solve the problem of reduced degradation of signal, Ritter also does not control the location of the user's hand so as to not block the transmissions satellite communication device's nor does it disclose the proper arrangement of the satellite communication device within the case to prevent detuning of the satellite communication device signal.

Hybrid devices that use both cellular communication and satellite communication paths exist, such as the TERRESTAR GENUS. The TERRESTAR GENUS product does not offer the benefit of allowing the user to combine the functionality of the two communication systems when the user already owns a device capable of communicating over one communication path.

VI. PREFERRED EMBODIMENTS

As shown in FIG. 1, the present protective case 100 for a communication device such as a smartphone is sized to detachably connect to the smartphone while maintaining the functionality of the smartphone and to serve as protection for at least one other device such as a satellite communication device. As shown in FIGS. 4 and 5, in one preferred embodiment the protective case 100 generally has six primary faces. The six faces are the top face 102, bottom face 104, left face 106, right face 108, front face 107, and back face 110. As shown in FIG. 4, in one preferred embodiment the front face 107 is substantially open to allow for the face of the smartphone to be accessible while the smartphone is placed within the protective case 100.

In another preferred embodiment, the protective case is constructed of a hard durable material to prevent accidental scratching or wear and tear on the contained devices such as a satellite communication device and a smartphone. Hard plastics such as polyurethanes, polyesters, epoxy resins and phenolic resins may be used. Of course, the invention is not limited by the particular type of material used in manufacture of the protective case 100. Any hard protective material that can be formed can suffice. One preferred embodiment may also have strategically placed grips on the protective case 100 for positioning a user's hand at a location that does not cover the antenna of satellite communication device and does not prevent a user's hand from slipping relative to the protective case 100.

As shown in FIG. 4, protective case 100 can be secured to the smartphone for example by lip 101. Lip 101 slightly extends from two or more faces such as top face 102, bottom face 104, left face 106, or right face 108 of protective case 100. The intersections of each of such face help secure a smartphone or other device by protective case 100. Any slight flexibility of the material from which the protective case 100 is made allows for the smartphone or other device to be snapped in and out of protective case 100 with minimal force, but exerts sufficient restraining force to prevent the smartphone from falling from the protective case 100 under its own weight or the magnitude of forces typically associated with normal operation of the smartphone. These constraints may guide the choice of construction materials. The length, height and width of each of the faces and protective case 100 can vary depending on the dimensions of the device with which the protective case 100 is to be used. In one embodiment, the smartphone is an iPhone 4. Of course, other devices and smartphones can be used. Protective case 100 should be sized according to the dimensions of the smartphone or other device used.

In other embodiments, protective case 100 is convertible such that use of the satellite communication device is possible and convenient without securing protective case 100 to a smartphone. In such embodiments, top face 102, bottom face 104, left face 106, right face 108 are hingedly or otherwise suitably connected to back face 110. When protective case 100 is secured to a smartphone, top face 102, bottom face 104, left face 106, right face 108 are substantially perpendicular to back face 110. When a smartphone of this embodiment is removed from the protective case 100, top face 102, bottom face 104, left face 106, right face 108 rotate hingedly to lay flat against the satellite communication device on a plane substantially parallel with back face 110. In such embodiments, each of the intersections between top face 102, bottom face 104, left face 106, right face 108 are arranged to allow such hinged rotation by, for instance, having a gap between the faces sufficient for rotation without any face blocking the rotation of an adjacent face or being constructed of flexible material.

As shown in FIGS. 2, 5, and 6, back face 110 has an upper tier 112 and a lower tier 114. Upper tier 112 is arranged to create a space between the smartphone and protective case 100 for placement of a satellite communication or other device and a battery pack or other power source the satellite communication or other device. Back face 110 has windows 116 to allow for the functions from the back face of a smartphone or other device, (e.g., a camera) and for controls of the satellite communication or other device. As shown in FIG. 2, the windows of a preferred embodiment are arranged to allow functionality of, for example, a Spot II Satellite GPS Messenger, with the communication module removed from its housing, and for the camera of the iPhone 4. One or more of windows 116 are covered by slides. The slides serve as protection from accidentally accessing the functions of the satellite communication device. The slides may be secured to protective case 100 by a backing that connects to the case. The slides can move to open and close windows 116.

The specific placement of the satellite communication device with respect to the protective case 100 allows for functionality of a smartphone and communications from a satellite communication device. The satellite communication device is secured to a protective case 100 by, for instance, one or more small screws into threaded holes in the protective case 100. In other embodiments, the satellite communication device could be attached to the protective case 100 by other means, including different fasteners or by a pre-formed construction enclosing the satellite communication device by a protective case 100. Attachments could be formed of Velcro materials and can be of the same color and material as case 100 or of different or contrasting colors or materials. Protective case 100 may be secured to a satellite communication device or to other devices by magnetic means. There may be one or more magnets, including for example, a magnetic plate substantially the same dimensions as bottom face 104 and securing magnetically to bottom face 104 to substantially share one to all four edges therewith. Such an arrangement can be used to secure protective case 100 containing a smartphone to a band around the arm of a user, for example, while the user jogs or exercises. As shown in FIG. 5, the threaded holes are arranged such that the satellite communication device is attached to protective case 100 and the smartphone is placed substantially within the protective case 100, a small space remains above the satellite patch antenna sufficient to prevent the detuning of the patch antenna. In such embodiments, using the IPHONE and the SPOT II SATELLITE GPS MESSENGER, the spacing would be between about 1 mm and 3 mm in thickness. Further, the threaded holes and upper tier 112 are arranged such that the satellite communication device is secured at a location that is above the area typically held by one's hand when on a phone call. This placement helps the functionality of the satellite communication device because the antenna of the satellite communication device will not detune due to the presence of a user's hand covering the antenna and thus causing degradation. With this placement, the patch antenna can be in a compact and convenient arrangement and function with minimal interference and without detuning. The compact design of protective case 100 allows for the use of a space-reducing antenna such as the patch antenna employed in the SPOT II SATELLITE GPS MESSENGER. Omnidirectional antennas, as the name implies, are designed to send and receive signals 360-degree around the antenna, meaning that these antennas, also known as helical antennas, can receive signals from any direction. Semi-directional antennas, such as a patch antenna, send and receive signals in a 180-degree pattern and are therefore more focused in directing a signal than omnidirectional antennas, like the helical antenna. Larger antenna can be less practical. For example, a helical antenna embedded into the face of the protective case may be ineffective because the signal could be blocked by both the smartphone and the user's head when the phone was held up to the user's ear.

Satellite communications devices such as the Spot Connect often locate a power source (generally battery cells) in a daughter board substantially parallel with and adjacent to a mother board. In one embodiment of protection case 100, the battery cells are located within protective case 100 adjacent to bottom face 104 and on a plane similar to that of the mother board of satellite communications device. Power is transmitted from the battery cells to the satellite communications device via a wired or other connection. In such arrangements, the thickness of the satellite communication device, as integrated into one embodiment of case 100, is substantially less than the thickness of the satellite communications device as it is commercially sold in its own housing. This allows one preferred embodiment to be thinner because the satellite communications device with its power source are arranged in a shape that closely mimics the shape of typical commercially available smartphones.

As shown in FIG. 3 and FIG. 4, top face 102, bottom face 104, left face 106, and right face 108 each may have holes to allow for the functionality of the smartphone. For example, as shown in FIG. 4, bottom face 104 has a hole such that a smartphone can attach to an electrical power source, the right face 108 has a hole to allow access to a volume button and top face 102 has a hole to allow access to an earphone jack or power button. Of course, these holes can be differently placed depending on the configuration of the intended smartphone to be used.

The protective case 100 can be modified to carry a variety of different communication devices while still allowing for the operability of a smartphone or other device. For example, protective case 100 can be modified for use with a satellite telephone. Further, protective case 100 can be used with two communication devices that allow for inter-communication between the devices. For another example, a satellite communication device can be the Spot Connect, which enables connection by Bluetooth to a smartphone. Thus, protective case 100 is extremely versatile and allows for convenient methods to communicate certain messages from a smartphone, which is traditionally not capable of communication through the satellite path, via satellite. In each arrangement, protective case 100 should secure a communication device such that the patch antenna is located at a position that does not detune and that no contact occurs between the smartphone housing and the other chosen satellite communication device.

I claim:

1. A protective case of a hard durable material shaped to receive a smartphone, said protective case comprising:

an attachment for securely coupling a satellite communication device to said protective case such that the satellite communication device is enclosed within an enclosure of the protective case when the satellite communication device is coupled to said protective case, said attachment configured to position said satellite communication device within the enclosure of said protective case to substantially prevent detuning of an antenna of said satellite communication device, said antenna being contained within the enclosure of said protective case when said satellite communication device is active.

2. The protective case of claim 1 wherein said attachment is configured to position said satellite communication device to substantially prevent detuning of the antenna of said satellite communication device when said smartphone and said satellite communication device are active.

3. The protective case of claim 1, wherein the protective case is configured to secure the satellite communication device to a back face of said smartphone when the satellite communication device is enclosed within the enclosure of the protective case.

4. The protective case of claim 1, wherein the attachment is configured to position the satellite communication device within the enclosure of the protective case at a location that is above the area typically held by a user's hand when the user is on a phone call.

5. The protective case of claim 4, wherein the protective case further comprises grips for positioning the user's hand at a location that does not cover the antenna of the satellite communication device.

6. The protective case of claim 1, wherein a space between the antenna and a surface of the enclosure of the protective case is between 1 mm and 3 mm in size.

7. The protective case of claim 1, wherein the protective case is configured to couple to electronic devices other than the satellite communication device.

8. The protective case of claim 1, further comprising a plurality of hingedly connected faces that are substantially perpendicular to a back face of the protective case when the protective case is in receipt of the smartphone and are substantially parallel to the back face of the protective case when the protective case is not in receipt of the smartphone.

9. The protective case of claim 1 configured to couple a battery pack for supplying power to the satellite communication device.

10. The protective case of claim 1, wherein the smartphone is not in contact with the satellite communication device when the protective case receives the smartphone and the satellite communication device is enclosed within the enclosure of the protective case.

11. A protective case shaped to receive a smartphone and to secure a satellite communication device to a back face of said smartphone, said protective case comprising:

a mechanism for securely coupling the satellite communication device having a patch antenna and a mother board to said protective case such that the satellite communication device is enclosed within an enclosure of the protective case when the satellite communication device is coupled to said protective case, said mechanism configured to position said satellite communication device within the enclosure of said protective case relative to said smartphone to substantially prevent detuning of said patch antenna of said satellite communication device, said patch antenna being contained within the enclosure of said protective case when said satellite communication device is active.

12. The protective case of claim 11, wherein said protective case is configured to secure, adjacent to a bottom face of said protective case and on a plane substantially parallel to that of the mother board of said satellite communication device, battery cells for said satellite communication device.

13. The protective case of claim 11 further configured to form an aperture above the patch antenna, said aperture having a sufficient size and shape to substantially prevent the detuning of the patch antenna.

\* \* \* \* \*